US010442076B1

(12) United States Patent
Auccello

(10) Patent No.: US 10,442,076 B1
(45) Date of Patent: Oct. 15, 2019

(54) ROADSIDE SAFETY MAT

(71) Applicant: Steven Auccello, Kendall Park, NJ (US)

(72) Inventor: Steven Auccello, Kendall Park, NJ (US)

( * ) Notice: Subject to any disclaimer, the term of this patent is extended or adjusted under 35 U.S.C. 154(b) by 0 days.

(21) Appl. No.: 16/211,156

(22) Filed: Dec. 5, 2018

(51) Int. Cl.

| | |
|---|---|
| ***B25H 5/00*** | (2006.01) |
| ***A47G 27/02*** | (2006.01) |
| ***F21V 21/10*** | (2006.01) |
| ***F21L 4/00*** | (2006.01) |
| ***F21W 131/10*** | (2006.01) |

(52) U.S. Cl.
CPC ........... *B25H 5/00* (2013.01); *A47G 27/0212* (2013.01); *F21L 4/00* (2013.01); *F21V 21/10* (2013.01); *F21W 2131/1005* (2013.01)

(58) Field of Classification Search
CPC ........... A47G 27/02; F21W 2131/1005; F21W 2131/402
See application file for complete search history.

(56) References Cited

U.S. PATENT DOCUMENTS

| | | | | |
|---|---|---|---|---|
| 4,744,015 A * | 5/1988 | Lai | F21S 9/02 200/86 R |
| 7,032,907 B1 * | 4/2006 | Marsh | B25H 5/00 280/32.5 |
| 7,967,466 B2 * | 6/2011 | Chu | F21S 6/002 362/183 |
| 8,444,287 B2 * | 5/2013 | Hardesty | E04F 15/02166 15/216 |
| 9,351,478 B2 * | 5/2016 | Hanft | A01K 15/025 |
| 10,036,550 B1 * | 7/2018 | Reid | G08G 1/0955 |
| 2010/0123293 A1 * | 5/2010 | Benjamin | B25H 5/00 280/32.6 |
| 2017/0108201 A1 * | 4/2017 | Shields | F21V 21/145 |
| 2017/0368677 A1 * | 12/2017 | Rotenberg | B25H 5/00 |
| 2018/0153328 A1 * | 6/2018 | Girard | E04F 15/02161 |

* cited by examiner

*Primary Examiner* — Alexander K Garlen
(74) *Attorney, Agent, or Firm* — Edwin D. Schindler

(57) ABSTRACT

A roadside repair safety mat includes a mat body that is, preferably, a flexible closed foam core with an integral top and bottom cover made of a sturdy waterproof material. The mat body includes a semi-circular, cut-out to fit around a flat tire on a vehicle and has receivers that fit poles for lighting a work area around the tire and caution poles nearer the road to flash a warning, which allows the user to kneel comfortably on the padded mat and to work in a secure environment while changing a tire at night. The mat includes pouches to carry necessary tools and is flexible so that it may roll up with the light poles and fit in a vehicle trunk.

18 Claims, 8 Drawing Sheets

ROADSIDE SAFETY MAT

BACKGROUND OF THE INVENTION

Technical Field of the Invention

The present invention relates, generally, to ground covers and, more particularly, to ground cover mats.

Even more specifically, the present invention relates to a padded weatherproof ground cover mat having a semi-circular cutout and a number of removable lighting poles at the corners. The mat allows the user to replace a flat tire or do other needed repairs in the dark while being able to kneel on the provided padded mat and while having the work area illuminated near the tire.

Description of the Prior Art

The prior art includes other ground cover mats which provide a padded surface to kneel upon, and with some prior art ground cover mats further incorporating illumination in one manner or another.

SUMMARY OF THE INVENTION

A primary object of the present invention is to provide a roadside safety mat that allows the user to safely change a tire on the side of a road at night.

Another object of the present invention is to provide a roadside safety mat that includes illumination poles at its corners to both light the work area and to warn oncoming or passing drivers of the potential hazard in place.

Yet another object of the present invention is to provide a roadside safety mat that is padded for the user's comfort.

Still yet another object of the present invention is to provide a roadside safety mat that is weatherproof so as to protect the user's clothing from dirt and moisture.

Another object of the present invention is to provide a roadside safety mat that may be rolled or folded so that it is easily transportable in a vehicle.

Yet another object of the present invention is to provide a roadside safety mat that includes a semi-circular cut-out to fit partially around the tire being repaired.

Still yet another object of the present invention is to provide a roadside safety mat where the illumination and warning lights may be powered either by batteries or by a vehicle charging port.

Additional objects of the present invention will appear as the description proceeds.

The present invention achieves the foregoing and related objects and overcomes the shortcomings of the prior art by providing a portable and deployable padded roadside mat that allows the user to safely change a tire by illuminating the work area and additionally warning other vehicles on the road by the lighting poles located at its corners.

More particularly, the present invention provides a roadside repair safety mat, which includes a flexible mat body having a top surface, a bottom surface and at least one peripheral side and having a semi-circular cut-out on one of the one ore more peripheral sides, along with a plurality of light pole receivers located on the top surface. There is at least one work light pole, which includes a work lamp and a power source and in which the work light pole is adapted to removably fit into one of the light pole receivers and wherein the work lamp emits a constant illumination when activated. At least one caution light pole is provides and includes a power source with the caution light pole being able to removably fit into a light pole receiver and wherein the caution lamp emits an intermittent warming illumination, when activated, so that a user may spread the flexible mat for roadside repairs with the top surface upwards and with the semi-circular cut-out fitted around a flat tire and, further, with at least one work light pole and at least one caution light pole being placed upright in the light pole receivers and activated.

It is thus desirable to provide a padded ground cover mat that protects the users clothing and provides a comfortable surface for kneeling on while fixing a tire or the like.

It is further desirable to provide a padded ground cover mat that includes a light emitting pole standing at each corner to both provide illumination for the work in hand but also to serve as warning lights for traffic traveling on the road.

Other objects and features of the present invention will become apparent when considered in combination with the accompanying drawing figures, which illustrate certain preferred embodiment of the present invention. It should, however, be noted that the accompanying drawing figures are intended to illustrate only select preferred embodiments of the claimed invention and are not intended as a means for defining the limits and scope of the invention.

BRIEF DESCRIPTION OF THE DRAWING FIGURES

In the drawing figures, wherein similar features are denoted with similar reference numerals throughout the several views.

DESCRIPTION OF THE REFERENCED NUMERALS

Figure 1:
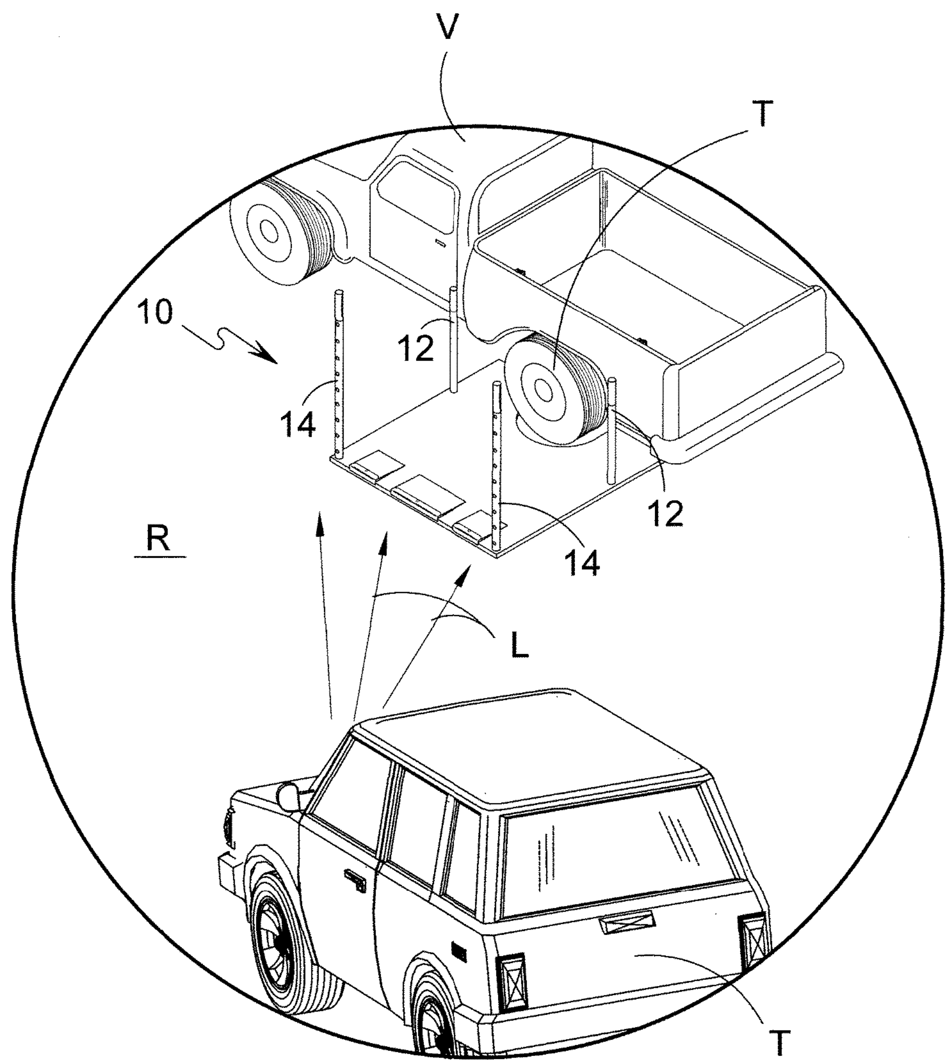
FIG. 1 is an overview of the roadside safety mat of the present invention, in use.

Turning now descriptively to the drawings, in which similar reference characters denote similar elements throughout the several views, the figures illustrate the use of the present invention. With regard to the reference numerals used, the following numbering is used throughout the various drawing figures:

U user
V vehicle
T traffic
R road
L line of sight
10 present invention

12 illumination poles
14 caution light poles
16 mat body
18 semi-circular cut-out portion
20 top surface pockets
22 flashing amber caution lamp
24 constant work lamp
26 closed foam mat portion
28 top and bottom weatherproof, waterproof cover
30 wiring
32 light pole contact
34 mat body contact
36 vehicle power adapter port
38 light pole receivers
40 battery
42 mat top surface
44 mat bottom surface
46 mat peripheral sides

DETAILED DESCRIPTION OF THE DRAWING FIGURES AND PREFERRED EMBODIMENTS

Turning, in detail, to an analysis of the accompanying drawing figures, FIG. 1 shows the present invention 10 in place next to the vehicle V pulled over on the side of the road R in preparation for changing tire T. Illumination poles 12 are closer to the vehicle to aid in the work. Caution light poles 14 warn traffic T of the potential hazard. The warning poles 14 are of sufficient height so as to create a clear line of sight as seen at L. More details of the present invention 10 will be explained below.

Figure 2:
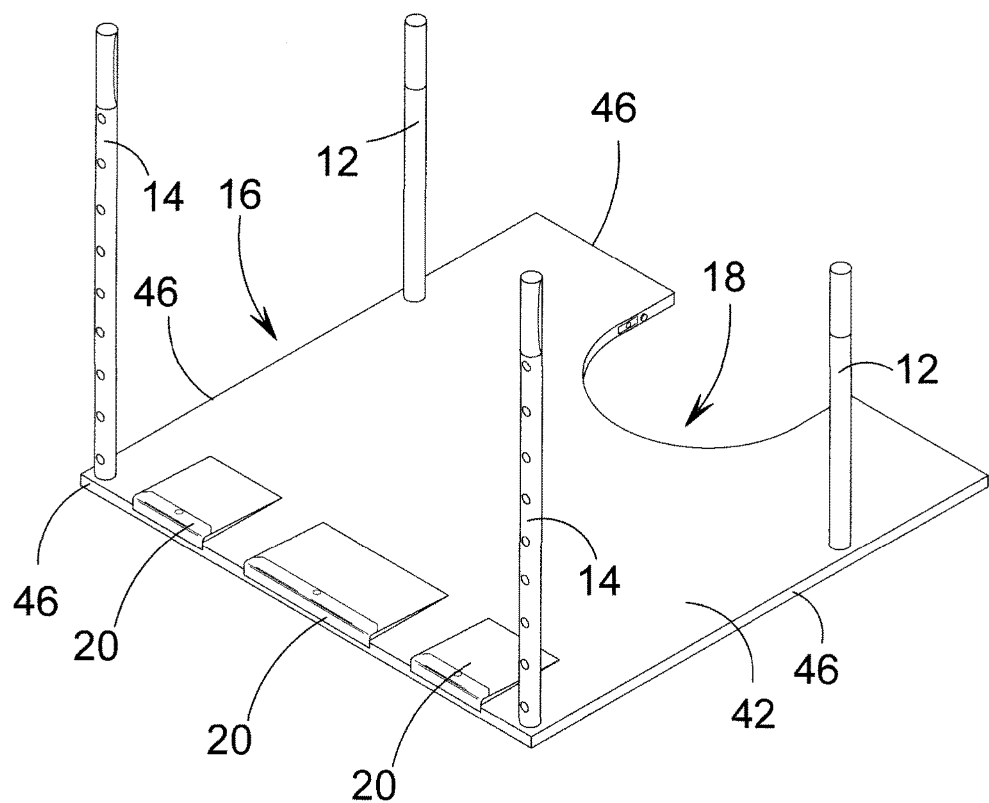
FIG. 2 is a perspective view of the roadside safety mat of the present invention.

FIG. 2 shows the present invention 10 in more detail with a mat body 16 having a top side 42 and four peripheral sides 46, one including a semi-circular cut-out portion 18. At the corners of the work area portion and on the top surface 42 of the mat body 16 are two sets of light poles; the work area illumination poles 12 and the caution light poles 14 which are fixed (in the embodiment described herein) in light pole receivers 38. These receivers will be discussed in further detail below. In the embodiment described herein, the preferred size of the mat body 16 would be approximately 48 inches on a side. The mat body 16 itself is made up of a sturdy top and bottom waterproof, weatherproof layer and an inner foam layer for comfort when kneeling on the mat 16. This will be further discussed below in reference to FIG. 6. The two illumination poles 12 provide sufficient ambient light for the user to work easily on the tire repair and the outer caution light poles 14 are taller and, in the preferred embodiment, emit a flashing amber light. Located on the top surface of the mat 16 are a number of built-in pockets 20 to hold tools, flares, medical equipment, or the like. These pockets could be releasably sealed and contain a predetermined variety of tools.

Figure 3:
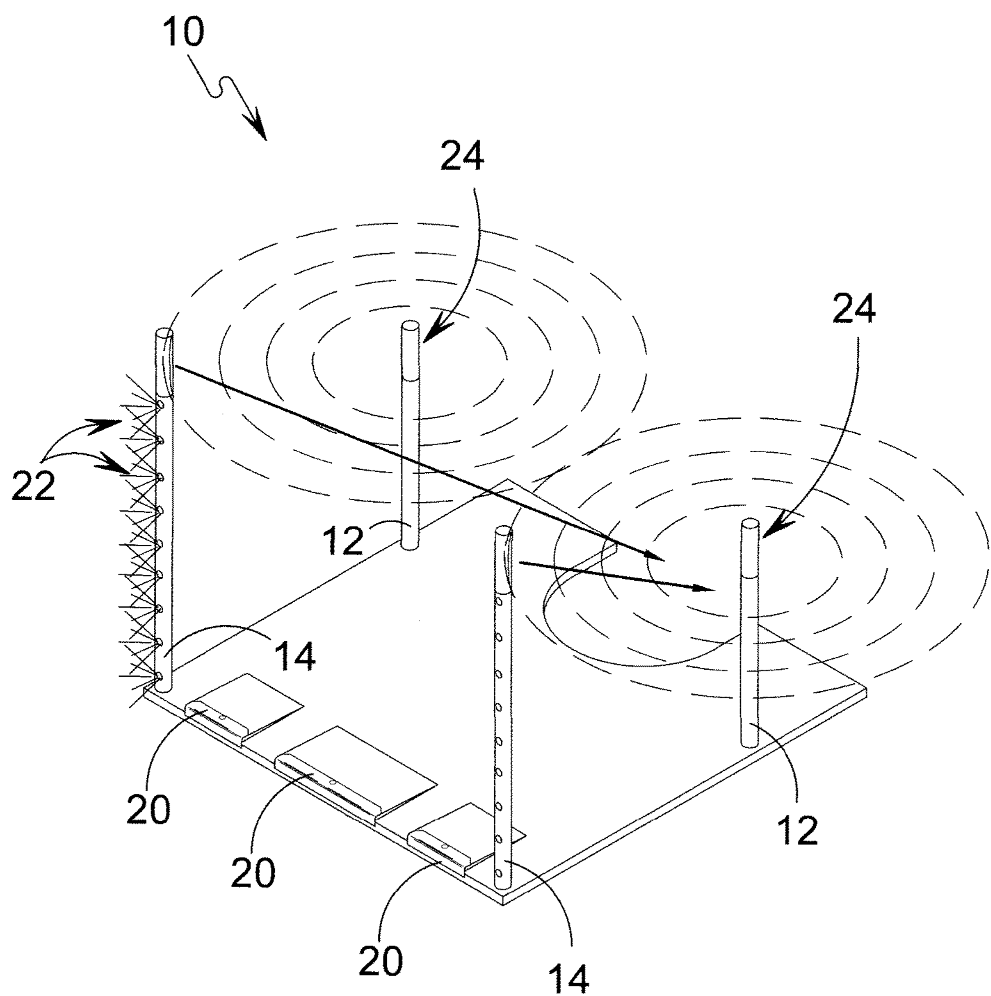
FIG. 3 is a perspective view of the roadside safety mat of the present invention showing the lighting pole types.

FIG. 3 shows the lighting arrangement of the present invention 10. On each of the corners of mat body 16 are located the light poles 12, 14. The inner light poles 12 (closer to the cut-out portion 18) are meant to provide constant illumination for the work area and as such are contemplated to be about 36 inches in height. As can be seen from FIG. 3, this light could be emitted from the tops of the poles 12 from lamps as indicated at 24. Light poles 14 are for the caution lights, preferably blinking amber lights 22. The light source could be located within the pole 14 itself, and be transmitted through apertures, as shown, or it could be located exteriorly of the pole 14. The caution light poles 14, as mentioned above, are preferably 48 inches tall to provide adequate visibility through line of sight. It is contemplated that the light poles 12, 14 would be powered by batteries as indicated at 40 in FIG. 7. Other means of powering the light poles 12, 14 will be discussed further below.

Figure 4:
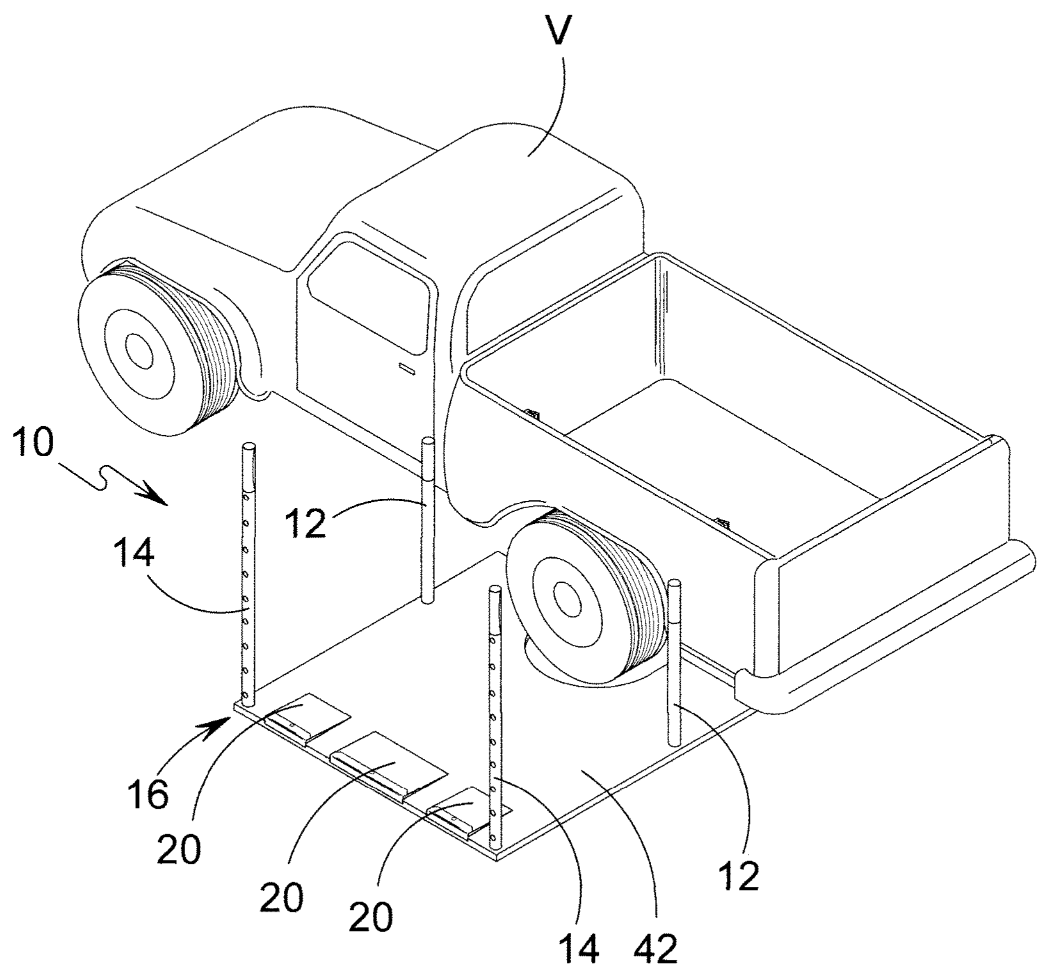
FIG. 4 is a further prospective view of the roadside safety mat of the present invention, in place, next to a vehicle.

FIG. 4 is a further prospective view of the present invention 10 in place next to a vehicle V. Note how the semi-circular cut-out portion 18 fits partially around the tire T. This prevents the user from inadvertently splashing or getting mud, dirt, or the like on their clothing while changing the tire T. The illumination light poles 12 are near the vehicle V to provide light to work by and the caution light poles 14 closer to the road warn approaching drivers of the potential hazard.

Figure 5:
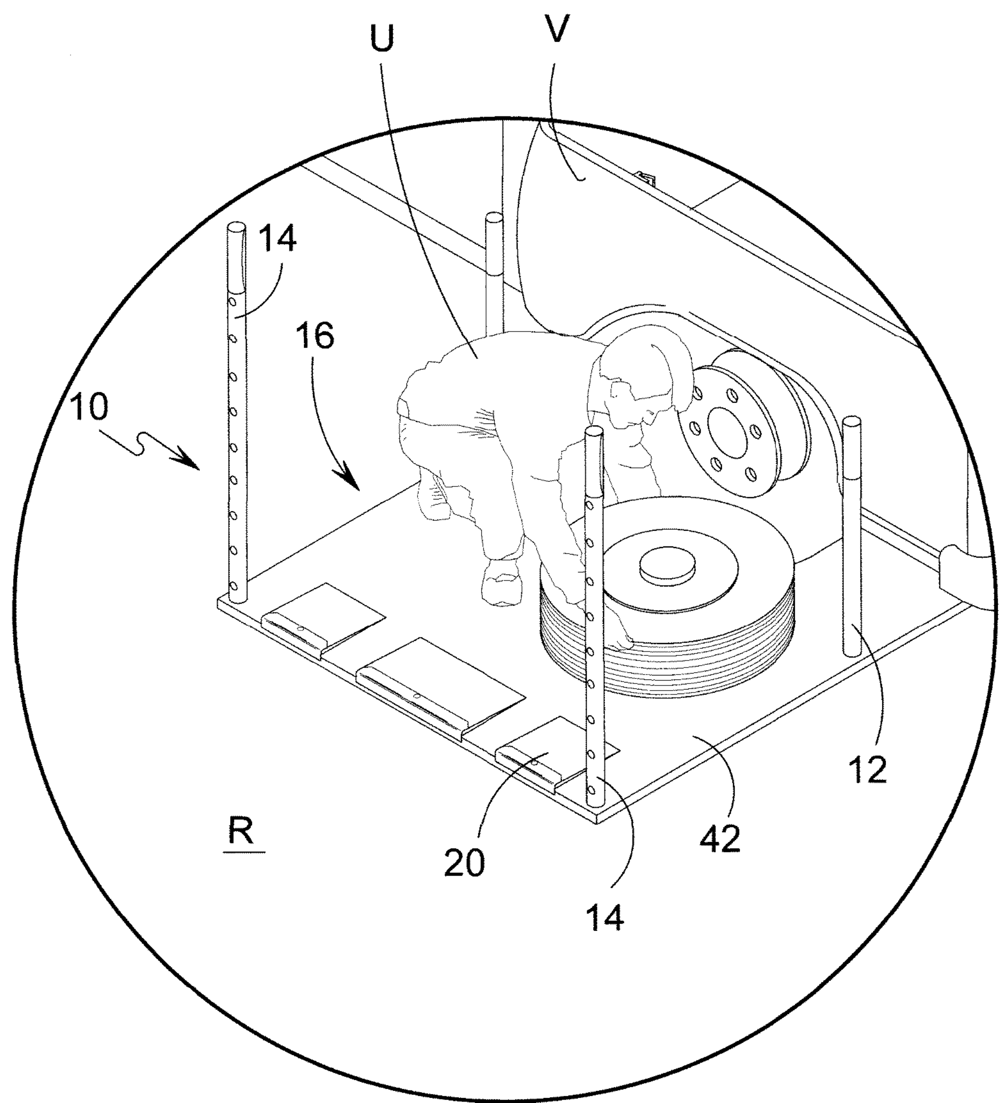
FIG. 5 is prospective view of the roadside safety mat of the present invention, in use, while a user is illustrated replacing a tire.

FIG. 5 shows a user U changing a tire T on the side of the road. The user U is kneeling on the top surface 42 of the mat body 16 which is made up of a flexible foam padding sandwiched between two layers of waterproof, weatherproof material. This will be discussed further in FIG. 6. The waterproof material prevents the user's clothing from becoming soiled in wet conditions while the light poles 12, 14 provide ambient work light and a warning signal for oncoming and passing traffic.

Figure 6:
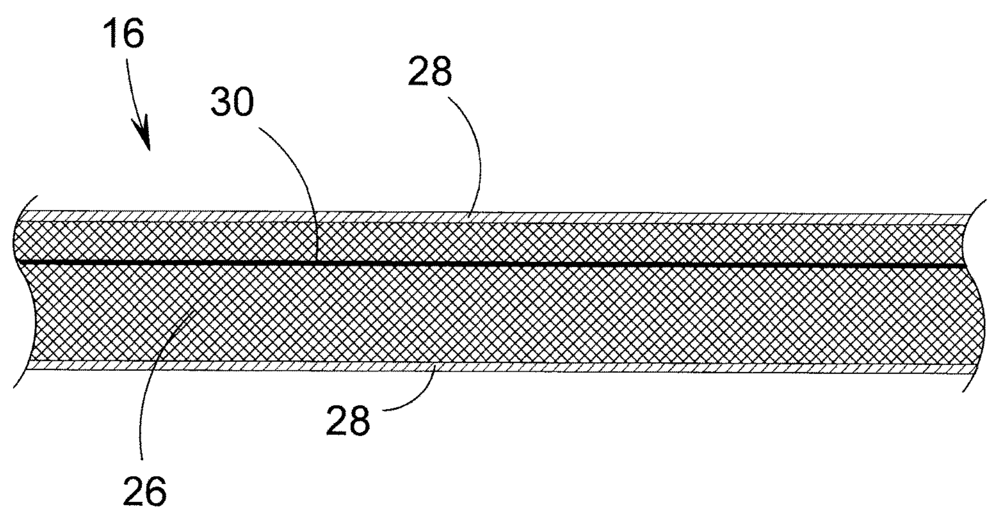
FIG. 6 is a cross-sectional view of the roadside safety mat portion of the present invention.

FIG. 6 shows a cross-sectional view of the mat body 16. In this preferred embodiment described herein, the mat body is made up of a central padded closed foam portion indicated at 26 sandwiched between two outer waterproof and weatherproof cover layers 28. It is contemplated that the outer cover layers 28 could be made of waterproof, durable materials such as polyurethane laminate, thermoplastic polyurethane, rip-stop Nylon, marine vinyl, or the like. It should also be noted that the closed foam inner portion 26, which provides the comfort padding for the instant invention 10 could be made of any type of soft, flexible material as desired. Also note in the Figure that in certain embodiments there is a wire 30. This connects the light poles 12, 14 to the power source, as will be discussed further below.

Figure 7:
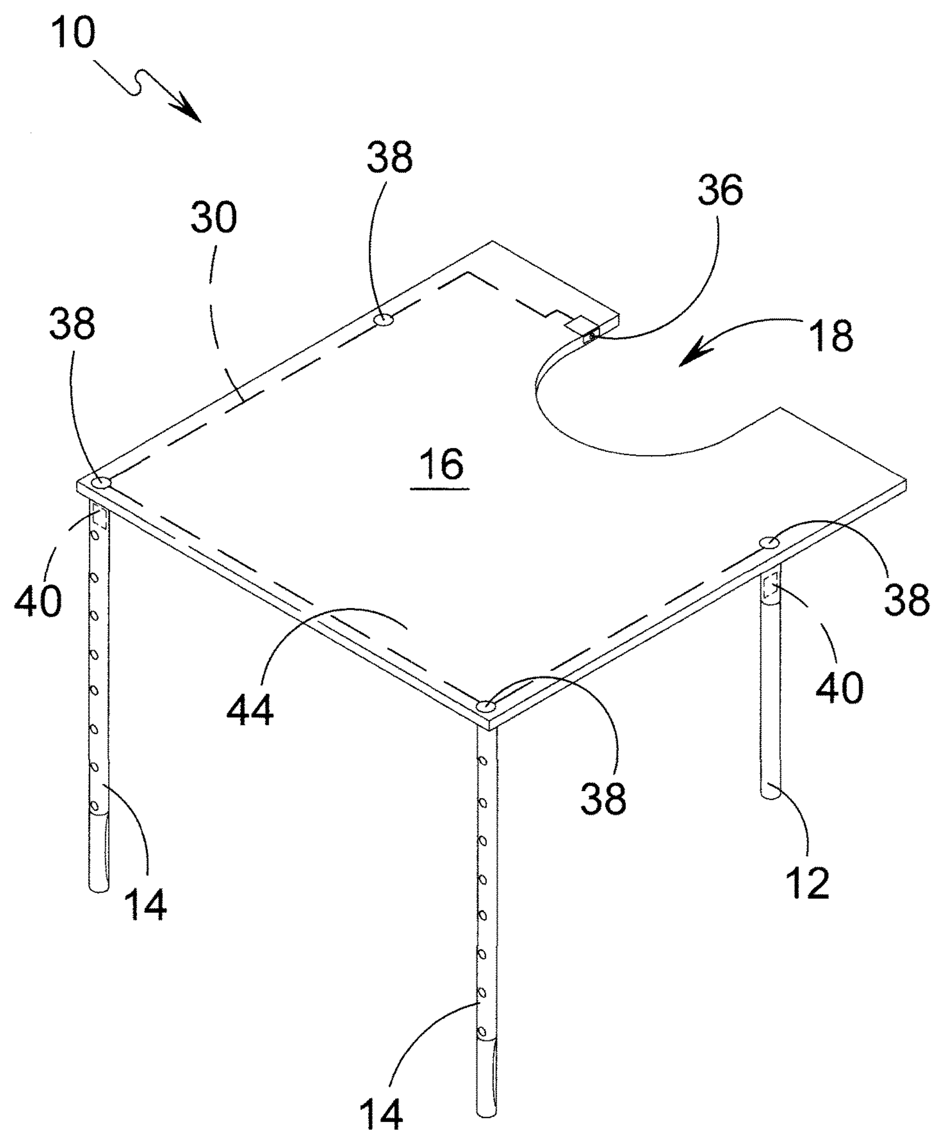
FIG. 7 is a bottom perspective view of the roadside safety mat of the present invention showing the location of the light pole receivers, the car charging port, and wiring; and, FIG. 8 shows an alternative, preferred embodiment of the roadside safety mat of the present invention wherein electrical contacts are located in the light pole's bases and in the mat's corners.

FIG. 7 is a bottom perspective view of the roadside safety mat of the present invention 10 showing the bottom surface 44, the wiring 30 and the vehicle charging port 36. This allows the light poles 12, 14 (and thus the lamps 22, 24) to be powered and/or recharged by plugging an adapter into the vehicle's power outlet connecting it to the batteries indicated at 40. It should be noted that the batteries 40 (which are located in each of the poles 12, 14) could be unconnected from an external power source to operate independently and be operated by an on/off switch. Also seen in the Figure are the locations of the pole receivers 38 located at the corners of the work area of the mat 16 for the securement of the light poles 12, 14.

Figure 8:
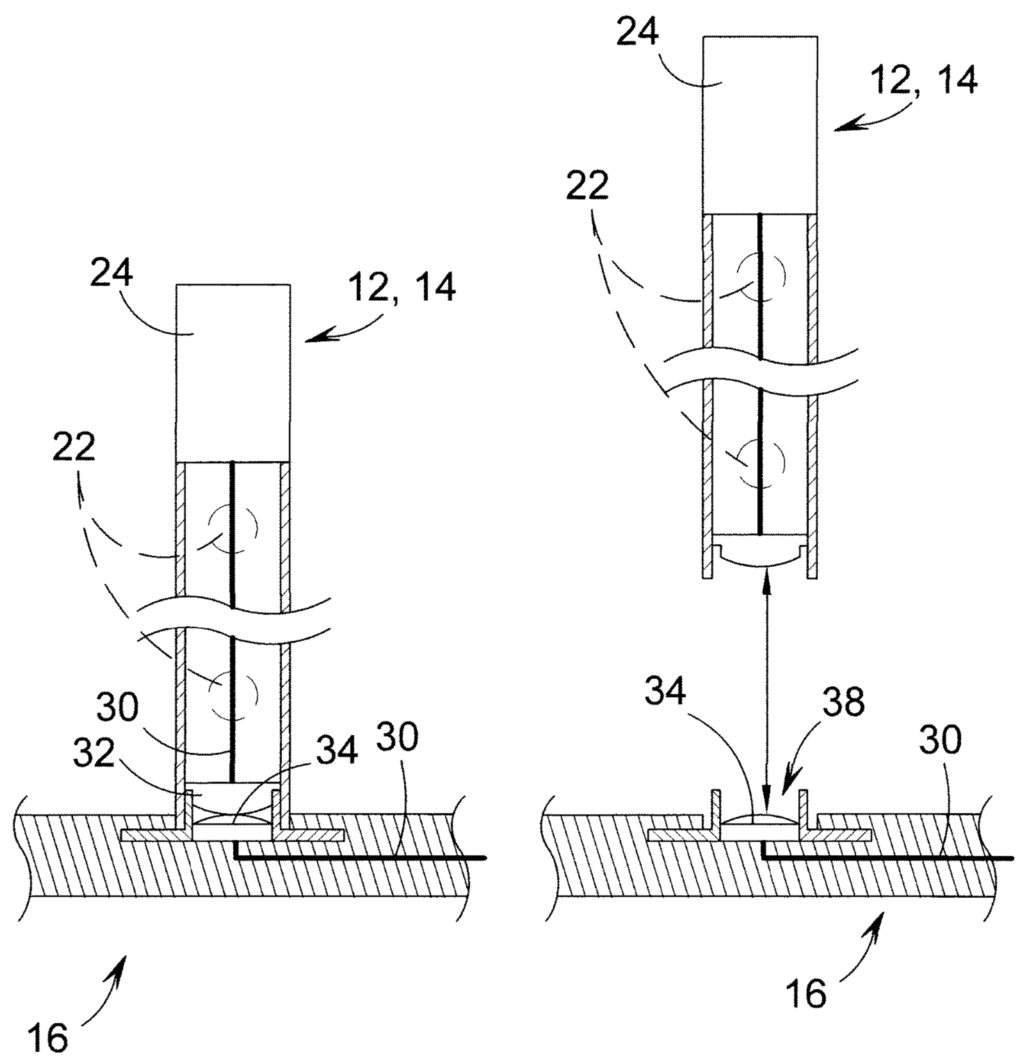

Lastly, FIG. 8 presents a more detailed view of the invention whereby the bases of the light poles 12, 14 are attached to the mat body 16, and additionally shows an alternative, preferred embodiment of the present invention. In FIG. 8, both types of poles 12, 14 are shown for brevity; the constant illumination or directed work light 12 emitting the work light illumination 24 and the flashing amber caution lights 14 emitting as indicated at 22. In any case, the poles 12, 14 are accommodated by the pole receivers 38 located in the mat body 16. As seen in FIGS. 6 and 7 the wire 30 that is connected to the power adapter port 36 terminates in FIG. 8, as seen in mat body contact 34. When the light pole 12, 14 is placed within the mat body pole receiver 38, the light pole contact 32 completes the circuit to power the lamps. The type of lamp used in implementation of the present invention 10 would preferably be an LED type so that it would run a long time on a battery charge during an emergency.

For use, the present invention 10 is stored rolled up in a bag or the like and placed in the interior or trunk of a vehicle. The pockets 20 could be pre-supplied with the tools necessary for most roadside repairs. The mat body 16, as has been mentioned above, is made up of a sandwiched closed-foam core between two weatherproof, waterproof cover portions. The poles 12, 14 are rolled inside the mat 16 for storage. In the case of a flat tire or the like, the mat 16 and the poles 12, 14 are taken out of the bag and the mat is unrolled so that the semi-circular cut-out portion 18 partially surrounds the tire T as seen in FIGS. 1, 4, and 5. There are four pole receivers 38 in each of the corners when the mat is unrolled. The poles 12, 14 are then placed in their appropriate receiver 38 and the lamps 22, 24 are activated. The user may then carry out the necessary repairs in more security and comfort.

While only several embodiments of the present invention have been shown and described, it will be obvious to those skilled in the art that many modifications may be made to the present invention without departing from the spirit and scope thereof.

What is claimed is:

1. A roadside safety mat, comprising: a flexible mat body having a top surface, a bottom surface, a peripheral side, and a semi-circular cut-out on said peripheral side; a plurality of light pole receivers located on said top surface of said flexible mat body; a work light pole having a work lamp and a power source, wherein said work light pole is able to removably fit into one of said plurality of light pole receivers, wherein said work lamp emits a constant illumination upon activation; and, a caution light pole having a caution lamp and a power source, wherein said caution light pole is able to removably fit into another one of said plurality of light pole receivers and wherein said caution lamp emits a intermittent warning illumination upon activation; wherein a user is able to spread said flexible mat for roadside repairs with said top surface upwards and the semi-circular cut-out fitting around a flat tire and with said work light pole and said caution light pole being placeable upright in said light pole receivers and activated.

2. The roadside repair safety mat according to claim 1, further comprising an additional work light pole, wherein said work light pole and said additional work light pole are located proximate said peripheral side of said roadside repair safety mat and also proximate the semi-circular cut-out.

3. The roadside safety mat according to claim 1, further comprising an additional caution light pole, wherein said caution light pole and said additional caution light pole are located proximate said peripheral side of said roadside safety mat and also distal from the semi-circular cut-out.

4. The roadside safety mat according to claim 3, wherein said caution light pole and said additional caution light pole include an amber lamp for emitting said intermittent warning illumination.

5. The roadside safety mat according to claim 4, wherein said top surface and said bottom surface have a weatherproof material sandwiching a closed-foam interior.

6. The roadside safety mat as according to claim 5, wherein said top surface of said mat body further includes a plurality of pockets for holding repair tools.

7. The roadside safety mat according to claim 1, wherein said top surface and said bottom surface have a waterproof material sandwiching a closed-foam interior.

8. The roadside safety mat according to claim 1, wherein said top surface of said mat body includes a plurality of pockets for holding repair tools.

9. The roadside safety mat according to claim 1, wherein said flexible mat body has a substantially rectangular shape with four peripheral sides.

10. A roadside safety mat, comprising: a flexible mat body having a top surface, a bottom surface and a peripheral side with a semi-circular cut-out on said peripheral side; a plurality of light pole receivers located on said top surface, wherein said mat body further includes a power adapter port and wiring between said power adapter port and each of said plurality of light pole receivers; a work light pole having a work lamp and a power source, said work light pole being able to removably fit into one of said light pole receivers for powering said work lamp, said work lamp emitting a constant illumination when activated; and, a caution light pole having a caution lamp and a power source, said caution light pole being able to removably fit into another one of said light pole receivers for powering said caution light pole, said caution lamp emitting an intermittent warning illumination when activated; wherein, a user is able to spread said flexible mat body for roadside repairs with said top surface upwards and with the semi-circular cut-out fitting around a flat tire and said work light pole and said caution light pole being able to be placed upright in said light pole receivers for connecting both the power source of said work light pole and the power source for said caution light pole to said power adapter port for activation of said work lamp and said caution lamp.

11. The roadside safety mat according to claim 10, further comprising an additional work light pole, wherein said work light pole and said additional work light pole are located proximate said peripheral side of said flexible mat body and also proximate the semi-circular cut-out.

12. The roadside safety mat according to claim 10, further comprising an additional caution light pole, wherein said caution light pole and said additional caution light pole are located proximate said peripheral side of said flexible mat boldy and also distal from the semi-circular cut-out.

13. The roadside safety mat according to claim 12, wherein said top surface and said bottom surface have a weatherproof material sandwiching a closed-foam interior.

14. The roadside safety mat according to claim 13, wherein said top surface of said mat body further includes a plurality of pockets for holding repair tools.

15. The roadside safety mat according to claim 14, wherein said caution light pole and said additional caution light pole include an amber lamp for emitting said intermittent warning illumination.

16. The roadside safety mat according to claim 10, wherein said top surface and said bottom surface have a weatherproof material sandwiching a closed-foam interior.

17. The roadside safety mat according to claim 10, wherein said top surface of said mat body further includes a plurality of pockets for holding repair tools.

18. The roadside safety mat according to claim 10, wherein said flexible mat body has a substantially rectangular shape with four peripheral sides.

* * * * *